(12) United States Patent
Ben-Dvora et al.

(10) Patent No.: US 9,559,958 B1
(45) Date of Patent: Jan. 31, 2017

(54) RESOLVING A MONITOR BASED ON INFORMATION IN A PLURALITY OF PACKETS

(71) Applicants: Nir Ben-Dvora, Herzelia (IL); Sarel Altshuler, Tel Aviv (IL)

(72) Inventors: Nir Ben-Dvora, Herzelia (IL); Sarel Altshuler, Tel Aviv (IL)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 14/093,013

(22) Filed: Nov. 28, 2013

(51) Int. Cl.
*H04L 12/851* (2013.01)
*H04L 12/801* (2013.01)
*H04L 12/813* (2013.01)
*H04L 29/06* (2006.01)

(52) U.S. Cl.
CPC ............. *H04L 47/10* (2013.01); *H04L 47/20* (2013.01); *H04L 65/80* (2013.01)

(58) Field of Classification Search
CPC ........... H04L 47/10; H04L 47/20; H04L 65/80
See application file for complete search history.

(56) References Cited

U.S. PATENT DOCUMENTS

| | | | |
|---|---|---|---|
| 6,839,751 B1 * | 1/2005 | Dietz et al. | 709/224 |
| 6,871,265 B1 | 3/2005 | Oren et al. | |
| 7,304,942 B1 | 12/2007 | Malladi et al. | |
| 7,391,721 B1 | 6/2008 | Holbrook | |
| 7,689,485 B2 | 3/2010 | Kanekar et al. | |
| 2005/0015644 A1 * | 1/2005 | Chu et al. | 714/4 |
| 2005/0238013 A1 * | 10/2005 | Tsuchinaga | H04L 12/5693 370/389 |
| 2010/0211673 A1 * | 8/2010 | Kosbab et al. | 709/224 |
| 2011/0185010 A1 * | 7/2011 | Shatsky et al. | 709/203 |
| 2012/0236716 A1 * | 9/2012 | Anbazhagan et al. | 370/235 |
| 2014/0304393 A1 * | 10/2014 | Annamalaisami et al. | 709/224 |

OTHER PUBLICATIONS

"Part 15.4: Low-Rate Wireless Personal Area Networks (LR-WPANs) Amendment 1: MAC sublayer," IEEE Std 802.15.4e™—2012, Apr. 16, 2012, IEEE, New York, New York.

(Continued)

*Primary Examiner* — Omar Ghowrwal
(74) *Attorney, Agent, or Firm* — The Law Office of Kirk D. Williams

(57) ABSTRACT

In one embodiment, accurate packet metrics are recorded despite delayed resolution of one or more traffic monitors that maintain the metrics for the packet flow. One or more metrics related to an initial plurality of packets of a packet flow are stored in a temporary metrics data structure. One or more monitors are subsequently resolved based on information included in packets of at least the initial plurality of packets. For example, an application or Wide Area Application Services (WAAS) segment that is to be monitored may not be identified until after numerous packets have passed. The monitor(s) are updated with metrics related to the packet flow based on said one or more metrics related to the initial plurality of packets from the metrics data structure and packets of the packet stream subsequent to the first one or more packets.

7 Claims, 5 Drawing Sheets

(56) References Cited

OTHER PUBLICATIONS

Duke et al., A Roadmap for Transmission Control Protocol (TCP) Specification Documents,"Nov. 21, 2013, draft-ietf-tcpm-tcp-rfc4614bis-01," The Internet Society, Reston, VA.
"Internet Protocol DARPA Internet Program Protocol Specification," Sep. 1981, RFC 791, The Internet Society, Reston, VA (fifty-one pages).
P. Almquist, "Type of Service in the Internet Protocol Suite," Jul. 1992, RFC 1349,The Internet Society, Reston, VA (twenty-eight pages).
Deering and Hinden, "Internet Protocol, Version 6 (IPv6) Specification," Dec. 1998, RFC 2460, The Internet Society, Reston, VA (thirty-nine pages).
Nichols et al, "Definition of the Differentiated Services Field (DS Field) in the IPv4 and IPv6 Headers," Dec. 1998, RFC 2474,The Internet Society, Reston, VA (twenty pages).
Abley et al., "Deprecation of Type 0 Routing Headers in IPv6," Dec. 2007, RFC 5095,The Internet Society, Reston, VA (seven pages).
S. Krishmnan, "Handling of Overlapping IPv6 Fragments," Dec. 2009, RFC 5722,The Internet Society, Reston, VA (six pages).
Arkko and Bradner, "IANA Allocation Guidelines for the IPv6 Routing Header," May 2010, RFC 5871,The Internet Society, Reston, VA (three pages).
Amante et al., "IPv6 Flow Label Specification," Nov. 2011, RFC 6437,The Internet Society, Reston, VA (fifteen pages).
Krishnan et al, "A Uniform Format for IPv6 Extension Headers," Apr. 2012, RFC 6564,The Internet Society, Reston, VA (six pages).
J. Touch, "Updated Specification of the IPv4 ID Field," Feb. 2013, RFC 6864,The Internet Society, Reston, VA (nineteen pages).
Eubanks et al., "IPv6 and UDP Checksums for Tunneled Packets," Apr. 2013, RFC 6935,The Internet Society, Reston, VA (twelve pages).
F. Gont, "Processing of IPv6 'Atomic' Fragments," May 2013, RFC 6946,The Internet Society, Reston, VA (nine pages).
Carpenter and Jiang, "Transmission and Processing of IPv6 Extension Headers," Dec. 2013, RFC 7045, The Internet Society, Reston, VA (ten pages).
Gont et al., "Implications of Oversized IPv6 Header Chains," Jan. 2014, RFC 7112,The Internet Society, Reston, VA (eight pages).

\* cited by examiner

RESOLVING A MONITOR BASED ON INFORMATION IN A PLURALITY OF PACKETS

TECHNICAL FIELD

The present disclosure relates generally to forwarding packets in a communications network and monitoring metrics associated therewith.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology. In order to evaluate a switching network's performance, testing and packet forwarding characteristics are collected.

BRIEF DESCRIPTION OF THE DRAWINGS

The appended claims set forth the features of one or more embodiments with particularity. The embodiment(s), together with its advantages, may be best understood from the following detailed description taken in conjunction with the accompanying drawings of which:

DESCRIPTION OF EXAMPLE EMBODIMENTS

1. Overview

Figure 1:
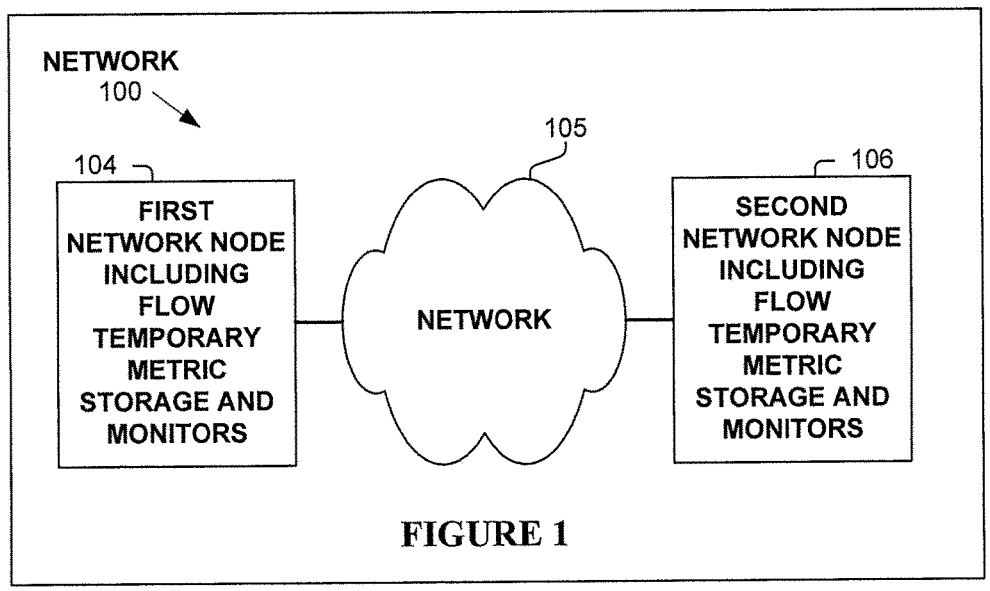
FIG. 1 illustrates a network operating according to one embodiment.

Disclosed are, inter alia, methods, apparatus, computer-storage media, mechanisms, and means associated with accurate packet metrics despite delayed resolution of traffic monitors.

One embodiment includes: storing in a metrics data structure by a particular machine one or more metrics related to an initial plurality of packets of a packet flow; resolving a monitor based on information included in packets of at least the initial plurality of packets after performing said storing said one or more metrics in the metrics data structure; and updating the monitor with metrics related to the packet flow based on said one or more metrics related to the initial plurality of packets from the metrics data structure and packets of the packet stream subsequent to the first one or more packets.

One embodiment includes: updating a monitor by a particular machine with one or more metrics related to each monitored packet of a plurality of existing packet flows; storing in a flow data structure by the particular machine one or more metrics related to a first plurality of packets of a new packet flow; resolving the monitor by the particular machine based on information included in packets of at least the first plurality of packets after performing said storing said one or more metrics in the flow data structure; and updating the monitor by the particular machine with metrics related to the new packet flow based on said one or more metrics related to the first plurality of packets from the flow data structure and packets of the packet stream subsequent to the first one or more packets so that the monitor reflects metrics related to the plurality of existing packet flows and the new packet flow.

One embodiment includes a packet switching device, comprising: a plurality of interfaces configured to send and receive packets; one or more packet switching mechanisms configured to packet switch packets among said interfaces; a particular monitor; temporary metrics storage for storing one or more metrics related to an initial plurality of packets of a packet flow until at least one monitor can be resolved for the packet flow; a classification engine configured to identify at least the particular monitor corresponding to the packet flow based on a plurality of packets of the initial plurality of packets of the packet flow; and the particular monitor configured to update monitored metrics based on a plurality of packet flows classified to be associated with the particular monitor, with said monitored metrics including metrics from said temporary storage for the packet flow.

One embodiment includes performing Quality of Service (QoS) processing of packets in the packet flow based on metrics maintained by one or more of the monitors.

2. Description

Disclosed are, inter alia, methods, apparatus, computer-storage media, mechanisms, and means associated with accurate packet metrics despite delayed resolution of traffic monitors. Traffic monitors record metrics related to associated flows of traffic. Examples of metrics include, but are not limited to, timestamps, byte counts, packet counts, delay, jitter, etc. In one embodiment, collectors are used to collect the metrics from the traffic monitors. Performance management operations (e.g., policing, filtering, performance verification, service level agreement compliance, etc.) are performed based on the metrics maintained by one or more monitors (e.g., directly, after accumulated by a collector, etc.). A flow of packets is a sequence of related packets. For example, in one embodiment, a flow of Internet Protocol (IP) is identified by the five tuple of source address, source port, destination address, destination port, and protocol type.

In one embodiment, a monitor maintains metrics for layer 7 applications or other groupings for a set of one or more packet flows. The selection of which monitor(s) correspond to a packet flow depends on an identification of a layer 7 application which is identified from information included in packets of a packet flow, typically in a first few packets or even between six and fifteen or more packets. Thus, these monitor(s) might not be resolved for a flow until after an initial few or numerous packets of the flow have been forwarded (e.g., passed a monitor that should record at least one metric for the flow).

For example, one embodiment monitors based on a particular application name which may not be discovered until up to approximately six packets (more or less depending on the implementation) of the flow have been forwarded past the monitor. Hence, the flow will not be resolved to such a monitor until after these packets have passed.

For another example, one or more monitors of one embodiment may not be resolved to a flow of packets until after the Transmission Control Protocol (TCP) 3-way handshake is complete (e.g., SYN, ACK, SYNACK). However, the monitor is supposed to record delay measurements between these TCP handshake packets (and/or other metrics), but the resolving of the monitor to the packet flow does not occur until after the packets have passed the monitor. For another example, a monitor might be resolved for a Wide Area Application Services (WAAS) segment that cannot be identified until after the TCP handshake.

One embodiment, in order to monitor accurate packet metrics despite delayed resolution of traffic monitors, maintains metrics for an initial plurality of packets of packet flows such that these metrics can be used once the delayed resolution of a monitor occurs. One embodiment limits this temporary collection of metrics to only flows that are candidates for resolution to a monitor after a plurality of packets have passed. One embodiment temporarily collects only metrics for a packet flow that may be used by a candidate monitor, while one embodiment collects a standard set of metrics (e.g., for all packet flows, for groups of packet flows, etc.).

Resolution of one or more monitors occurs after an initial plurality of packets of the flow have been received and forwarded. Upon identification of an application name, connection handshake, or other identifiable trigger based on these initial plurality of packets, resolution to one or more monitors occurs. The temporary statistics of the flow can then be provided to the one or more monitors such that they can have data from the initial packet of the flow of packets. Also, the temporary monitoring of the flow is typically terminated.

However, it is possible that metrics of a same flow may be recorded by a plurality of different monitors—which may include multiple monitors that are not resolved to the packet flow until after several packets have passed. One embodiment therefore waits until the resolution of all possible monitors for a flow before ceasing to temporarily collect metrics for the flow.

Embodiments described herein include various elements and limitations, with no one element or limitation contemplated as being a critical element or limitation. Each of the claims individually recites an aspect of the embodiment in its entirety. Moreover, some embodiments described may include, but are not limited to, inter alia, systems, networks, integrated circuit chips, embedded processors, ASICs, methods, and computer-readable media containing instructions. One or multiple systems, devices, components, etc., may comprise one or more embodiments, which may include some elements or limitations of a claim being performed by the same or different systems, devices, components, etc. A processing element may be a general processor, task-specific processor, a core of one or more processors, or other co-located, resource-sharing implementation for performing the corresponding processing. The embodiments described hereinafter embody various aspects and configurations, with the figures illustrating exemplary and non-limiting configurations. Computer-readable media and means for performing methods and processing block operations (e.g., a processor and memory or other apparatus configured to perform such operations) are disclosed and are in keeping with the extensible scope of the embodiments. The term "apparatus" is used consistently herein with its common definition of an appliance or device.

The steps, connections, and processing of signals and information illustrated in the figures, including, but not limited to, any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process said read value—the value must be obtained prior to processing it, although some of the associated processing may be performed prior to, concurrently with, and/or after the read operation). Also, nothing described or referenced in this document is admitted as prior art to this application unless explicitly so stated.

The term "one embodiment" is used herein to reference a specific embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the terms "first," "second," etc., are typically used herein to denote different units (e.g., a first element, a second element). The use of these terms herein does not necessarily connote an ordering such as one unit or event occurring or coming before another, but rather provides a mechanism to distinguish between specific units. Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps. Finally, a reference to a "specific machine," "particular machine" or similar when recited in a method claim for performing steps, refers to a specific machine within the 35 USC §101 machine statutory class.

Turning to the figures, FIG. 1A illustrates a network 100 operating according to one embodiment. Shown are two network nodes 104 and 106 communicatively coupled via interconnecting network 105. Network nodes 104 are 106 are configured to record accurate packet metrics despite delayed resolution of traffic monitors until after several initial packets of a packet flow have passed a monitor that should be recording metrics based on these initial packets.

Figure 2A:
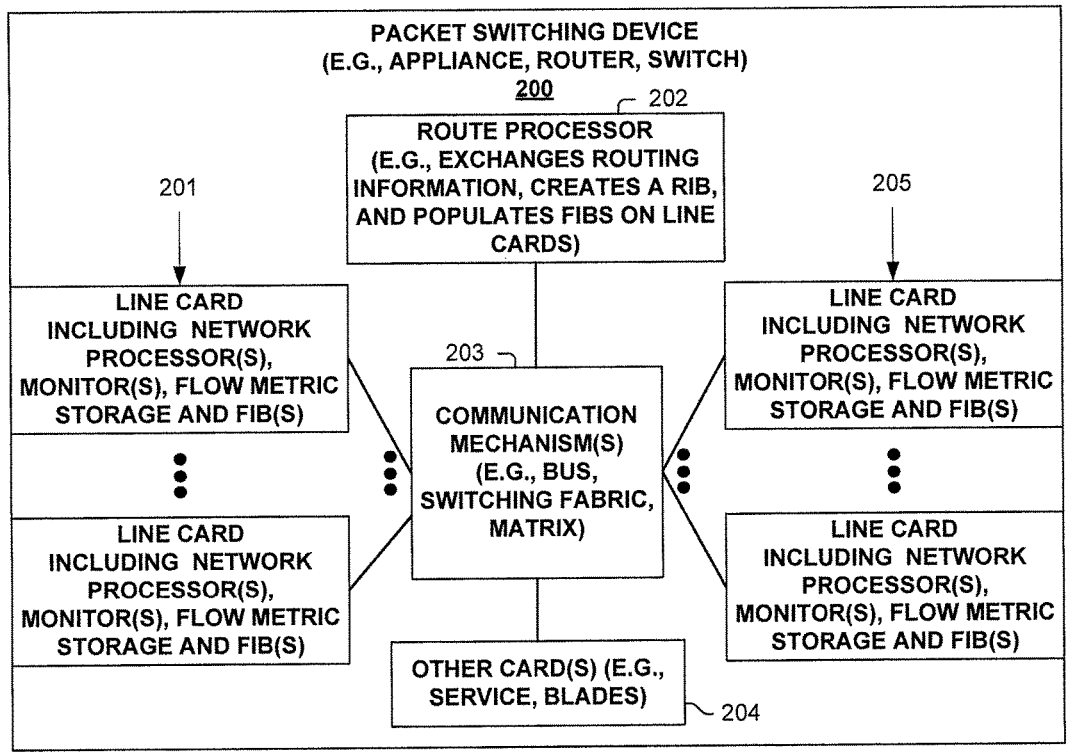
FIG. 2A illustrates a packet switching device according to one embodiment.

One embodiment of a packet switching device 200 (e.g., one example of a network node) is illustrated in FIG. 2A. As shown, packet switching device 200 includes multiple line cards 201 and 205, each with one or more network interfaces for sending and receiving packets over communications links, and with one or more processing elements that are used in one embodiment associated with accurate packet metrics despite delayed resolution of traffic monitors. Packet switching device 200 also has a control plane with one or more processing elements 202 for managing the control plane and/or control plane processing of packets associated with accurate packet metrics despite delayed resolution of traffic monitors. Packet switching device 200 also includes other cards 204 (e.g., service cards, blades) which include processing elements that are used in one embodiment to process packets associated with accurate packet metrics despite delayed resolution of traffic monitors, and some communication mechanism 203 (e.g., bus, switching fabric, matrix) for allowing its different entities 201, 202, 204 and 205 to communicate. In one embodiment, the collection of accurate metrics despite delayed resolution of the corresponding traffic monitor(s) is performed on a single line card 201, 205, or on multiple line cards 201, 205 (e.g., those line cards which packets of the flow traverse). In one embodiment, packet switching device 200 has one or more RF interfaces (possibly only one such interface), such as, but not limited to that based on IEEE 802.15.4e.

Figure 2B:
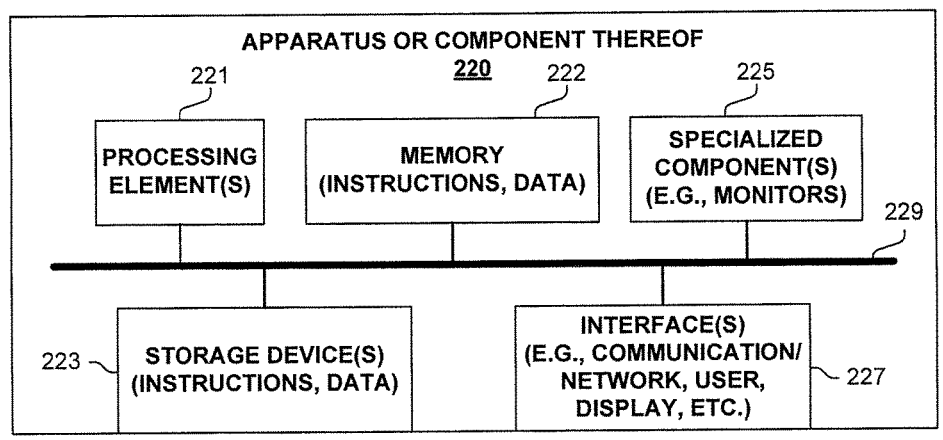
FIG. 2B illustrates an apparatus according to one embodiment.

FIG. 2B is a block diagram of an apparatus 220 (e.g., path computation engine or a network node, or portion thereof) used in one embodiment associated with accurate packet metrics despite delayed resolution of traffic monitors. In one embodiment, apparatus 220 performs one or more processes, or portions thereof, corresponding to one of the flow diagrams illustrated or otherwise described herein, and/or illustrated in another diagram or otherwise described herein.

In one embodiment, apparatus 220 includes one or more processing element(s) 221, memory 222, storage device(s) 223, specialized component(s) 225 (e.g. optimized hardware such as for performing packet processing operations, classification, monitor resolution, temporarily recording metrics of a packet flow, monitoring packet flows, etc.), and interface(s) 227 for communicating information (e.g., sending and receiving packets, user-interfaces, displaying information, etc.), which are typically communicatively coupled via one or more communications mechanisms 229, with the communications paths typically tailored to meet the needs of a particular application. In one embodiment, interface 227 is one or more RF interfaces, such as, but not limited to that based on IEEE 802.15.4e.

Various embodiments of apparatus 220 may include more or fewer elements. The operation of apparatus 220 is typically controlled by processing element(s) 221 using memory 222 and storage device(s) 223 to perform one or more tasks or processes. Memory 222 is one type of computer-readable/computer-storage medium, and typically comprises random access memory (RAM), read only memory (ROM), flash memory, integrated circuits, and/or other memory components. Memory 222 typically stores computer-executable instructions to be executed by processing element(s) 221 and/or data which is manipulated by processing element(s) 221 for implementing functionality in accordance with an embodiment. Storage device(s) 223 are another type of computer-readable medium, and typically comprise solid state storage media, disk drives, diskettes, networked services, tape drives, and other storage devices. Storage device (s) 223 typically store computer-executable instructions to be executed by processing element(s) 221 and/or data which is manipulated by processing element(s) 221 for implementing functionality in accordance with an embodiment.

Figure 3A:
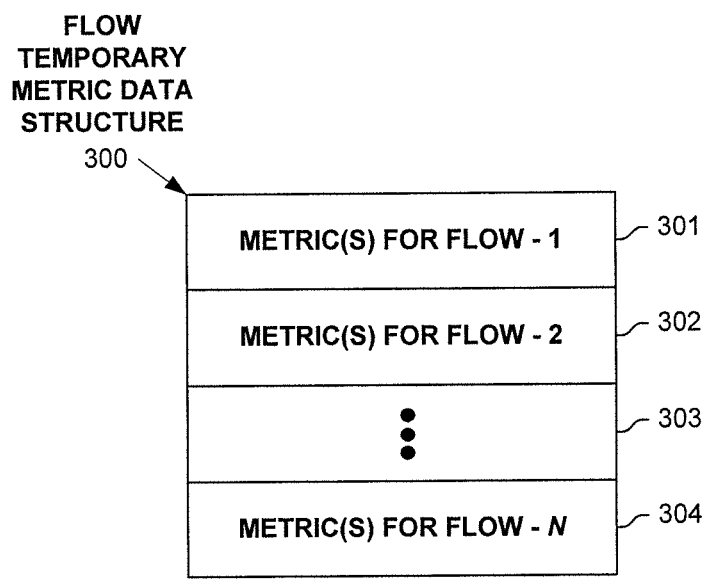
FIG. 3A illustrates a data structure according to one embodiment.

Illustrated in FIG. 3A is flow temporary metric data structure 300 used in one embodiment to store metrics about a flow prior to resolution to zero or more monitors that cannot occur until after an initial plurality of packets have been received (and forwarded as a packet switching device cannot save all packets until resolution occurs). In one embodiment, a hash operation is performed, based on all or a portion of the packet fields that identify a packet flow, to identify a position 301-304 in data structure 300 to store the metrics, with accommodation for hashing conflicts. In one embodiment, a standard set of metrics is recorded, which may include, but is not limited to, packet count, byte count, list of timestamps of packets, other identifying information about a packet (e.g., is it a connection handshake packet), etc.

Figure 3B:
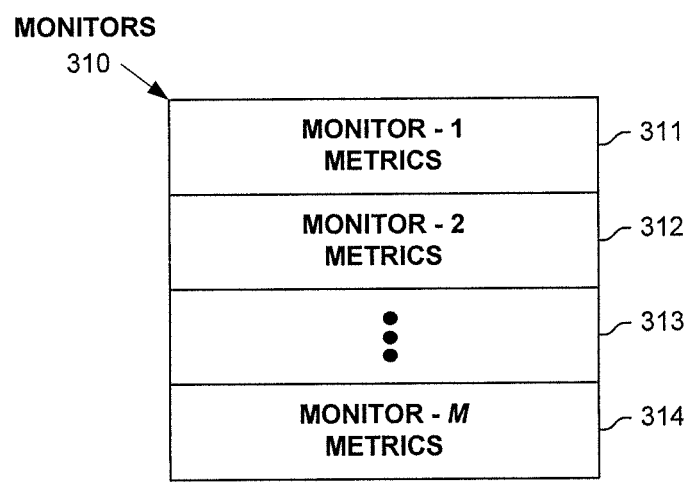
FIG. 3B illustrates a set of monitors according to one embodiment.

Illustrated in FIG. 3B are monitors 310, used in one embodiment to store metrics about one or more flows resolved to one or more monitors 311-314. In one embodiment, one or more classification operations are performed in identifying the one or more monitors 311-314 for a given packet flow.

Figure 4A:
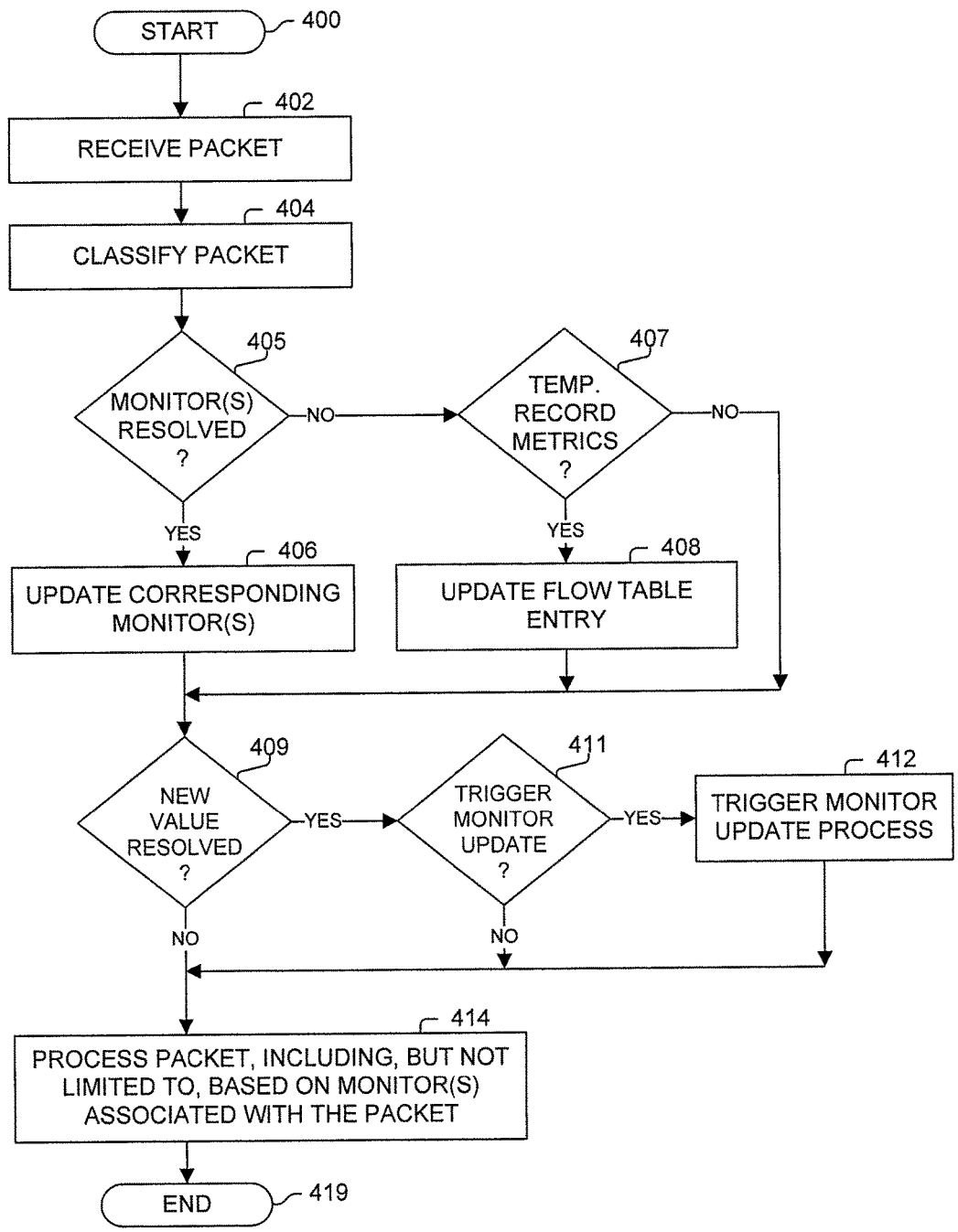
FIG. 4A illustrates a process according to one embodiment.

FIG. 4A illustrates a process performed in one embodiment. Processing begins with process block 400. In process block 402, a packet is received. In process block 404, the packet is classified in order to determine whether monitor resolution has been performed on the packet flow and/or to determine whether to temporarily store metrics in a flow table (or other) data structure related to the received packet. In one embodiment, a lookup operation is performed on an identified application (e.g., application-ID) associated with the packet. In one embodiment, a lookup operation is performed on one or more values from the packet, such as, but not limited to, those used to identify the packet flow. As determined in process block 405, if the monitor(s) for the packet flow have been resolved, then in process block 406, the corresponding one or more monitors are updated with metric(s) related to the received packet, and processing continues to process block 409. Otherwise, as determined in process block 407, if metrics for the packet are to be temporarily collected (e.g., it is a packet of an initial plurality of packets which may be used to resolve one or more monitors), then in process block 408, a flow table entry for the received packet is updated, and processing continues to process block 409.

As determined in process block 409, if based on the received packet a new type (e.g., application, TCP handshake, WAAS segment or other type that cannot be identified from a first packet of a flow) to monitor is resolved, then processing proceeds to process block 411, otherwise, processing proceeds to process block 414. As determined in process block 411, if a monitor update should be triggered (e.g., all possible monitors for the packet flow have been identified based on the initial plurality of packets), then in process block 412, a monitor update process is triggered; otherwise, processing proceeds to process block 414.

In process block 414, the packet is processed normally, which may include processing (e.g., Quality of Service (QoS) processing) based on one or more monitors associated with the packet (e.g., itself or packet flow). Processing of the flow diagram of FIG. 4A is complete as indicated by process block 419.

Figure 4B:
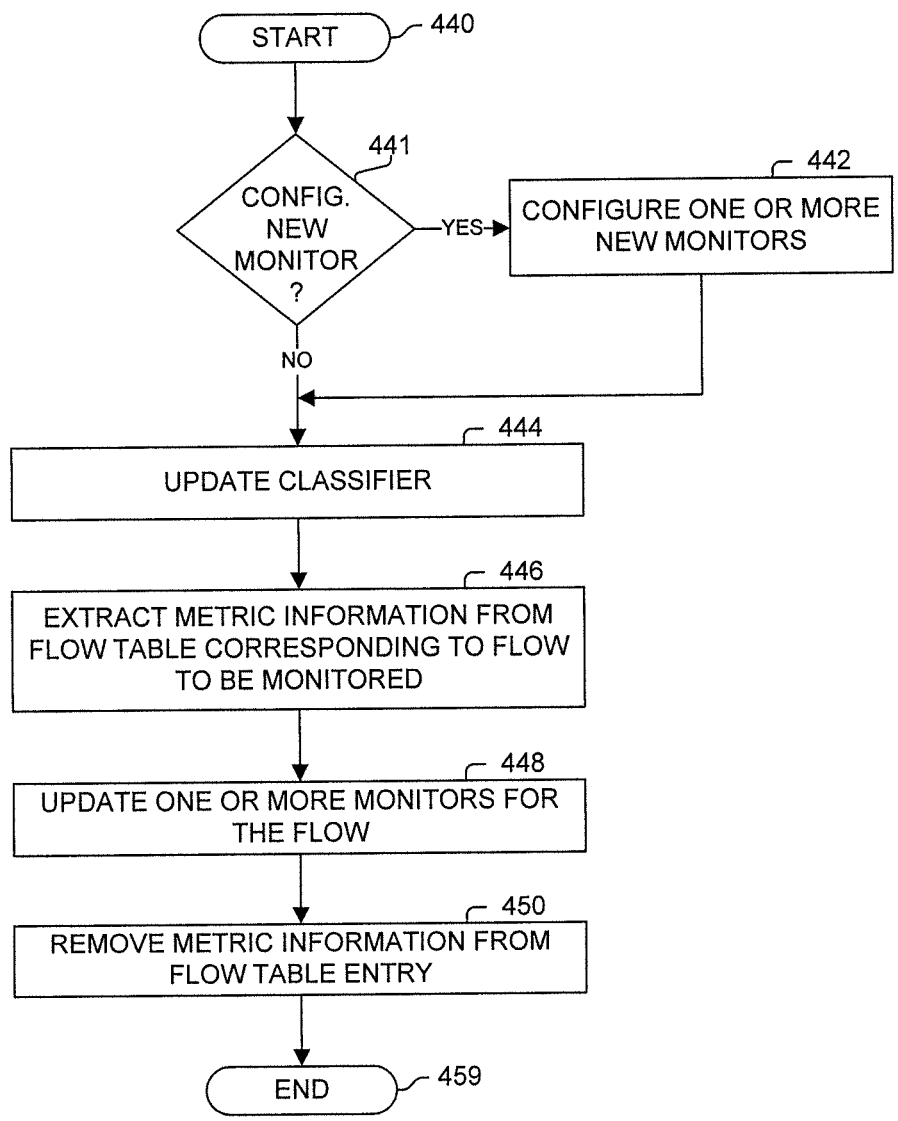
FIG. 4B illustrates a process according to one embodiment.

FIG. 4B illustrates a triggered monitor update process performed in one embodiment. Processing begins with process block 440. If one or more monitors should be configured for a new resolution as determined in process block 441, then in process block 442, the new monitor(s) are configured (e.g., a new record is created or existing entry updated corresponding to the resolved application). In one embodiment, a new monitor is used. In one embodiment, a monitor for other packet flows and monitored type is already established. Processing continues with process block 444.

In process block 444, the classifier is updated such that metrics of packets of the flow will be recorded by one or more resolved monitors. In one embodiment, an entry is added in the flow table to directly or indirectly point to the resolved monitor(s) for the flow. In process block 446, metric information is extracted from the flow table corresponding to the flow for which one or more monitors have been resolved based on an initial plurality of packets. In process block 448, one or more correspondingly resolved monitors are updated with this metric information. In process block 450, the metric information extracted in process block 446 is removed from the flow table. Processing of the flow diagram of FIG. 4B is complete as indicated by process block 459.

In view of the many possible embodiments to which the principles of the disclosure may be applied, it will be appreciated that the embodiments and aspects thereof described herein with respect to the drawings/figures are only illustrative and should not be taken as limiting the scope of the disclosure. For example, and as would be apparent to one skilled in the art, many of the process block operations can be re-ordered to be performed before, after, or substantially concurrent with other operations. Also, many different forms of data structures could be used in various embodiments. The disclosure as described herein contemplates all such embodiments as may come within the scope of the following claims and equivalents thereof.

What is claimed is:

1. A method, comprising:
    storing in a metrics data structure by a particular machine one or more metrics related to an initial plurality of packets of a packet flow;
    resolving a monitor based on information included in packets of at least the initial plurality of packets after performing said storing said one or more metrics in the metrics data structure;
    updating the monitor with metrics related to the packet flow based on said one or more metrics related to the initial plurality of packets from the metrics data structure and packets of a packet stream subsequent to the initial plurality of packets; and
    delaying said updating the monitor until a plurality of monitors, including the monitor, of the particular machine have been resolved as being associated with the packet flow based on additional one or more packets being in the initial plurality of packets after said resolving the monitor.

2. The method of claim 1, comprising performing Quality of Service (QoS) processing of packets in the packet flow based on metrics maintained by the monitor.

3. The method of claim 2, wherein said QoS processing includes verifying performance metrics.

4. The method of claim 2, wherein said QoS processing includes policing.

5. The method of claim 1, wherein said resolving the monitor includes determining an application corresponding to the packet flow based on the initial plurality of packets and selecting the monitor based on a name of the application.

6. An apparatus comprising:
    a metrics data structure storing one or more metrics related to an initial plurality of packets of a packet flow; and
    a plurality of monitors, including a particular monitor, with the particular monitor resolved based on information included in packets of at least the initial plurality of packets after said one or more metrics are stored in the metrics data structure, and after delaying until the plurality of monitors have been resolved as being associated with the packet flow based on additional one or more packets being in the initial plurality of packets after the particular monitor is resolved, updating the particular monitor with metrics related to the packet flow based on said one or more metrics related to the initial plurality of packets from the metrics data structure and packets of a packet stream subsequent to the initial plurality of packets.

7. The apparatus of claim 6, wherein the particular monitor in being resolved includes determining an application corresponding to the packet flow based on the initial plurality of packets and selecting the particular monitor based on a name of the application.

* * * * *